United States Patent [19]

Sanderson et al.

[11] Patent Number: 4,942,218
[45] Date of Patent: Jul. 17, 1990

[54] PROCESS FOR THE PREPARATION OF POLYMERS HAVING AN INORGANIC BACKBONE

[75] Inventors: William A. Sanderson, Menlo Park; David L. King, Mountain View, both of Calif.

[73] Assignee: Catalytica Associates, Inc., Mountain View, Calif.

[21] Appl. No.: 197,459

[22] Filed: May 23, 1988

[51] Int. Cl.$^5$ .................. C08G 67/00; C08G 79/04
[52] U.S. Cl. ............................. 528/381; 528/395; 556/19
[58] Field of Search .................. 528/395, 381; 556/19

[56] References Cited

U.S. PATENT DOCUMENTS

| | | | |
|---|---|---|---|
| 3,457,195 | 7/1969 | Block et al. | 528/395 |
| 4,232,146 | 11/1980 | DiGiamoco et al. | 528/395 |
| 4,235,990 | 11/1980 | DiGiamoco et al. | 528/287 |
| 4,235,991 | 11/1980 | DiGiamoco et al. | 528/391 |
| 4,256,872 | 3/1981 | DiGiamoco et al. | 528/395 |
| 4,267,308 | 5/1981 | Parziale et al. | 528/395 |
| 4,276,409 | 6/1981 | DiGiamoco et al. | 528/362 |

*Primary Examiner*—Wilbert J. Briggs, Sr.
*Attorney, Agent, or Firm*—Robert J. Baran

[57] ABSTRACT

The present invention provides a method of making a polymer by reacting, in the absence of water, an organic compound having the general formula R-H wherein R represents an organo radical having at least one unsaturated carbon-carbon bond and H is covalently bonded to one of said carbons, with $PX_3$, wherein X is a halide radical, and zirconium ions to yield a reaction product and oxidizing and hydrolyzing such reaction product to yield a polymer represented by the general formula $Zr(O_3PR)_n$ wherein n varies from about 1 to about 2.5. R may comprise sulfonic acid groups or may comprise sulfonatable site for sulfonation during the oxidation step. In either case, the resulting product is useful as an acid catalyst.

24 Claims, No Drawings

PROCESS FOR THE PREPARATION OF POLYMERS HAVING AN INORGANIC BACKBONE

BACKGROUND OF THE INVENTION

1. Field of the Invention

This invention provides a process for preparing polymers having an inorganic backbone comprising zirconium linked to phosphorus through an oxygen bridge.

2. Description of the Art

A novel class of compounds is known, which compounds may be described as inorganic polymers. These compounds are described in U.S. Pat. Nos. 4,232,146; 4,235,990; 4,235,991; 4,256,872; 4,267,308; 4,276,409; 4,276,410; 4,276,411; 4,298,723; 4,299,943; 4,373,079; 4,384,981; 4,386,013; 4,390,690; 4,429,111; and 4,436,899 which are hereby incorporated by reference. These compounds may be prepared having a layered structure similar to the layered structure of zirconium phosphate. The above patents teach that these novel layered compounds have many uses. However, these layered compounds are sometimes difficult to prepare.

The inorganic polymers are generally prepared by a process which comprises reacting, in an aqueous medium, at least one acid compound, i.e. an organo-substituted, phosphorus atom-containing acid, having the formula $((HO)_2OPO_x)_kR$ wherein k may be either 1 or 2 and, R is an inorganic radical, with at least one tetravalent metal ion (e.g. Zr) to precipitate a solid in which the molar ratio of phosphorus atom to tetravalent metal is about 2 to 1, the phosphorus atom is covalently bonded to R when x equals 0, and R is linked to the phosphorus atom through oxygen when x equals 1.

When R contains hydrophilic groups, e.g. carboxyl, sulfo, etc., the reaction product may not separate as an easy-filterable solid. Thus, centrifuging, etc. may be required to recover the reaction product.

Sulfonated derivatives of the above inorganic polymers have been disclosed as useful acid catalysts in International Application No. PCT/US87/090885 (WO87/06244) published on Oct. 22, 1987. These sulfonated catalysts may be prepared from phosphorus-atom containing acids wherein R contains a sulfo substituent; or an inorganic polymer having a sulfonatable radical may be prepared, separated and subsequently sulfonated. In the first instance, the hydrophilic sulfo group may cause the inorganic polymer to be difficult to separate from the aqueous medium. In the second instance, the multiple steps required are undesirable.

The present invention provides a simplified method for preparing the polymers of the above references. Moreover, the present invention provides a method for preparing said polymers as a precipitate which is easy to separate from the reaction medium. Finally, the present invention provides a method for preparing a sulfonic acid-containing polymer, suitable as an acid catalyst, as a precipitate which is easy to filter from the reaction medium, and which does not require the separation of the polymer from the reaction medium in which it is formed, prior to sulfonation.

SUMMARY OF THE INVENTION

The invention provides a method of making a polymer having an inorganic backbone comprising zirconium linked to phosphorus through an oxygen bridge by reacting, in the absence of water, an organic compound having the general formula R—H, wherein R represents an organo radical having at least one unsaturated carbon-carbon bond and H is covalently bonded to one of said carbons, with $PX_3$, wherein X represents a halide radical, in the presence of zirconium ions, to provide a reaction product. This reaction product is subsequently oxidized and hydrolyzed to recover a polymer represented by the general formula $Zr(O_2POR)_n$ wherein n varies from about 1 to about 2.5.

In one embodiment of the present invention, $PX_3$ is provided in an amount greater than necessary to dihalophosphinate the organo radical, R, and upon subsequent oxidation and hydrolysis the excess amount of $PX_3$ is oxidized and hydrolyzed to provide units represented by the general formula $Zr(O_3POH)$ in the recovered polymer.

In another embodiment of the present invention, the organo radical R contains sites for sulfonation and after reacting said organic compound with $PX_3$, an excess of a sulfonating agent, e.g. chlorosulfonic acid is added to simultaneously oxidize the phosphorous and sulfonate said organo radical.

DETAILED DESCRIPTION OF THE INVENTION

Organic compounds suitable for the method of the present invention may be represented by the general formula RH wherein R comprises at least one unsaturated carbon-carbon bond and H is covalently bonded to one of said carbons to provide a site for dihalophosphination by the dihalophosphinating agent $PX_3$. In general, R will include at least one olefinic or aryl radical; preferably an aryl radical. R is preferably a hydrocarbyl radical but may comprise in addition to hydrogen and carbon, heteroatoms which will not interfere with the dihalophosphination reaction such as halogen, nitrogen, phosphorus, oxygen or other heteroatom-containing substituents.

More preferably, R is represented by radicals having the general formula

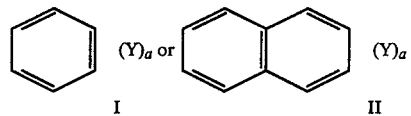

wherein Y represents a halogen radical, a lower alkyl radical having from 1 to about 5 carbon atoms, a lower alkyoxy radical having from 1 to about 5 carbon atoms, an aryl radical having up to 9 carbon atoms, and a is an integer of from 0 to 3. More preferably, R is a hydrocarbyl, i.e., a is 0, or Y is an alkyl, aryl or arylalkyl radical. Most preferably, R is a hydrocarbyl radical represented by general formula I above. For example, R may be phenyl, diphenyl or phenylalkyl and alkyl substituted derivatives thereof, especially phenyl and phenylethyl.

$PX_3$ is preferably phosphorus trichloride or phosphorus tribromide with the trichloride most preferred.

The zirconium ions are provided by a zirconium salt or compound that is at least slightly soluble in the reaction medium in which the dihalophosphination reaction will be carried out. For example, zirconium halides are suitable, including zirconium oxyhalides, but other zirconium salts and compounds such as sulfates may be utilized. Preferably, the zirconium source is a chloride or bromide salt such as $ZrCl_4$ or $ZrBr_4$.

The dihalophosphination reaction is carried out in the absence of water, followed by oxidizing the product. The oxidizing conditions may be provided by air, $O_2$, $Cl_2$ or oxidants such as chlorosulfonic acid, $H_2S_2O_7$, etc. If the oxidant is also a sulfonation agent, the concentration thereof must be adjusted to avoid sulfonation of the organo radical, unless of course a sulfonated product is desired, as described below. In general, if the above oxidants are maintained at an equivalent ratio equal to or less than the phosphorus, then oxidation only will take place.

The dihalophosphination reaction and/or the oxidation reaction may be carried out neat or in the presence of an inert solvent and at a temperature and pressure sufficient to effect the desired reaction. The preferred temperature range for such reactions are from 50° to 150° C., more preferably from 75° to 85° C. The pressure range may vary from ambient to superatmospheric, preferably from 1 atm to 10 atm.

After dihalophosphination and oxidation, the resulting reaction product is hydrolyzed by contacting with sufficient water and agitating to precipitate a solid which is easily separated by filtration, decantation, etc. The solid generally settles from the aqueous medium without centrifugation.

If it is desired to obtain an inorganic polymer having pendant sulfonyl radicals, e.g. sulfonic acid radicals, the organo radical may be selected to provide a sulfonatable radical such as described in the above PCT application and said sulfonatable radicals may be sulfonated subsequent to the separation of a precipitate of the inorganic polymer. Alternatively and preferably, the sulfonation is carried out during the above oxidation by providing an excess of a sulfonating agent, preferably chlorosulfonic acid, to simultaneously oxidize the reaction product of RH and $PX_3$ from

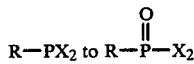

and sulfonate the organo radical R to provide a reaction product represented by the formula

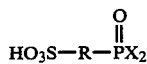

Again, the sulfonation conditions are well-known in the art. Preferably, the temperature for such reaction may range between 50° C. and 150° C., more preferably between 75° C. and 100° C. and the pressure range may vary from ambient to super atmospheric, e.g. from to 1 to 10 atm. Thus, in the presence of a zirconium halide, e.g. $ZrX^1_4$ wherein $X^1$ comprises a chloride or bromide radical, and R is $R^1$, wherein $R^1$ is an aryl radical, e.g. a phenyl radical, the reaction product of the dihalophosphination reaction will comprise $R^1$—$PX_2.ZrX^1_4$, e.g.

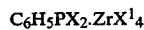

Which upon oxidation will comprise

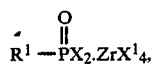

e.g.

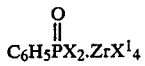

which upon hydrolysis will comprise $Zr(O_3PR^1SO_3H)_n$, e.g.

$Zr(HO_3SC_6H_4PO_3)_n$.

The dihalophosphination reaction may be carried out in the presence of a suitable inert solvent. It has been discovered that if a chlorinated solvent such as dichloroethane is utilized as the solvent, dimers of the organo radical, R, may be formed. For example, in a method wherein R is $R^1$, e.g. phenyl and the solvent is dichloroethane, the dihalophosphination product may be represented by:

and if the simultaneous oxidation and sulfonation is effected by chlorosulfonic acid, the precipitate recovered following hydrolysis is represented by the formula:

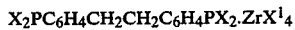

More generally, when the dihalophosphination is carried out in the presence of a solvent represented by $R^2(X^1)_b$ wherein $R^2$ is alkyl radical; having from 2 to about 8 carbon atoms, $X^1$ is as defined above and b is an integer of 2 or 3. Then the resulting dihalophosphination product may be represented by $(X_2PR)_bR^2$ which upon oxidation will yield

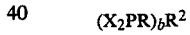

and upon hydrolysis will yield

All of the sulfonated derivatives described above are useful acid catalysts as described in the above PCT application. Furthermore, all of the compounds of this invention may be used as described in the above U.S. patents.

The invention is further illustrated by the following examples which are illustrative of various aspects of the invention, and are not intended as limiting the scope of the invention as defined by the appended claims.

EXAMPLE 1

Equimolar amounts of $PCl_3$ and $ZrCl_4$ were refluxed for eight hours in excess benzene solution. Excess benzene was removed and the residue dissolved in 1, 2-dichloroethane. Four molar equivalents of chlorosulfonic acid were then added, and the solution heated to 165° C., during which process the 1, 2 dichloroethane was allowed to volatilize. The solution was heated at 165° for four hours, then cooled. The product was hydrolyzed with water and the off-white solid filtered using a medium glass frit, and washed with water and ethyl alcohol. The product was filtered, dried in a vacuum oven at 40° C., and had an IR and NMR spectra similar to sulfophenyl zirconium phosphonate products prepared by the conventional precipitation reaction between aqueous sulfophenyl phosphonic acid and aqueous zirconyl chloride. The latter product cannot be isolated by filtration but must be centrifuged.

EXAMPLE 2

Zirconium tetrachloride (466 g, 2 moles) benzene (78 g, 1 mole) phosphorus trichloride (605 g, 4.4 moles), and dichloroethane (500 ml) were mixed and refluxed for 12 hours, after which time gas evolution had substantially ceased. The reaction mixture was cooled to 20° C. and chlorosulfonic acid (513 g, 4.4 moles) added dropwise over about 1 hour, during which there was vigorous gas evolution. The mixture was refluxed for 1 hour and then poured into 4 liters of water and crushed ice. The white, precipitated solid was filtered through a coarse glass precipitated solid was filtered through a coarse glass fritted funnel, washed thoroughly with water and finally with acetone and dried at 110° C. to give 652 g of product.

This product had the theoretical structure $Zr(O_3PC_6H_4CH_2CH_2C_6H_4PO_3)_{0.25}(O_3P\ OH)_{1.5}$

| Elemental Analysis: | |
|---|---|
| Theoretical (%) | Found (%) |
| P 19.4 | 18.4 |
| C 13.1 | 13.0 |
| H 1.56 | 1.76 |
| Zr 28.6 | 33.0, 26.5 |
| P/Zr 2 | 1.6, 2.0 |

The $^{13}C$ and $^{31}P$ NMR spectra were consistent with the structure assigned.

EXAMPLE 3

The product of Example 2 (3.2 g) was stirred in dichloroethane (50 ml) and chlorosulfonic acid (2.3 g) added. The mixture was refluxed for 1 hour, then filtered and the solid washed with dichloroethane and evacuated to dryness. It was washed with water until the washings were sulfate-free and then it was dried at 110° C. in vacuo. The theoretical product was:

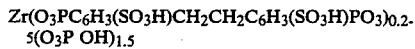

$Zr(O_3PC_6H_3(SO_3H)CH_2CH_2C_6H_3(SO_3H)PO_3)_{0.2\text{-}5}(O_3P\ OH)_{1.5}$

| Elemental Analysis: | |
|---|---|
| Theoretical (%) | Found (%) |
| Zr 25.4 | 28.1 |
| P 17.2 | 19.5 |
| S 4.5 | 2.2 |
| P/Zr 2 | 1.99 |
| S/P 0.25 | 0.11 |

This indicates that about half of the aromatic rings were sulfonated by this treatment.

EXAMPLE 4

The product of Example 2 (7.4 g) was added to a stirred solution of freshly distilled $SO_3$ (24.8 g) in dichloroethane (100 ml). The mixture was refluxed for 2 hours, then filtered and the solid washed with water until the washings were sulfate-free and then dried.

| Elemental Analysis: | |
|---|---|
| Theoretical (%) | Found (%) |
| Zr 25.4 | 23.9 |
| P 17.2 | 16.1 |
| S 4.5 | 4.4 |
| P/Zr 2 | 1.98 |
| S/P .25 | .26 |

These results indicate that each aromatic ring was monosulfonated.

While particular embodiments of the invention have been described, it will be understood, of course, that the invention is not limited thereto since many obvious modifications can be made and it is intended to include within this invention any such modifications as will fall within the scope of the appended claims.

What is claimed:

1. A method of making an polymer which comprises:
   (a) reacting, in the absence of water, an organic compound having the general formula R—H wherein R represents an organo radical having at least one unsaturated carbon-carbon bond and H is covalently bonded to one of said carbons, with $PX_3$, wherein X is a halogen atom, further provided that R is selected from the group consisting of hydrocarbyl radicals and hetero-atom-containing hydrocarbyl radicals, wherein the heteroatom substituents do not interfere with the di halo-phosphination reaction of step (a), and a Zr compound, to yield a reaction product and (b) oxidizing and (c) hydrolyzing the reaction product of step (a) to yield a polymer represented by the general formula $Zr(O_3PR)_n$ wherein n varies from about 1 to about 2.5.

2. The method of claim 1 wherein R is an aryl radical.

3. The method of claim 2 wherein X is selected from the group consisting of Cl and Br.

4. The method of claim 2 wherein n is about 2.

5. The method of claim 2 wherein said reaction product is oxidized by contacting with chlorosulfonic acid at oxidizing conditions.

6. The method of claim 2 wherein R is phenyl.

7. The method of claim 6 wherein R is phenyl, and chlorosulfonic acid is provided in excess to recover the polymer as a sulfonated phenyl derivative.

8. The method of claim 2 wherein said polymer is recovered as a precipitate.

9. The method of claim 2 wherein the molar ratio of $PX_3$ to RH is greater than 1 and the polymer is recovered having units represented by the general formula $Zr(O_3POH)$ therein.

10. The method of claim 6 wherein said reaction is carried out in the presence of a chlorinated hydrocarbon solvent.

11. The method of claim 10 wherein said chlorinated hydrocarbon solvent is 1,2 dichloroethane.

12. A method of preparing a polymer represented by the general formula $Zr(O_3PR)_n$ wherein R is an organo radical having at least one unsaturated carbon-carbon bond and n varies from about 1 to about 2.5, which comprises:
  (a) reacting, in the absence of water, a phosphorus trihalide represented by the general formula $PX^1_3$, wherein $X^1$ represents chlorine or bromine, with R—H, wherein H is covalently bonded to R at the unsaturated carbon-carbon bond, said reaction being carried out in the presence of a zirconium halide salt, to provide a reaction product comprising a mixture of R—$PX^1_2$ and zirconium ions, further provided that R is selected from the group consisting of hydrocarbyl radicals and hetero-atom-containing hydrocarbyl radicals wherein the hetero-atom substituents do not interfere with the di halo-phosphination reaction of step (a).

13. The method of claim 12 wherein R comprises an aryl radical.

14. The method of claim 12 wherein the molar ratio of $PX^1_3$ to RH is greater than 1 and the polymer is recovered having units represented by the general formula $Zr(O_3POH)$ therein.

15. The method of claim 12 wherein said reaction product of step (a) is oxidized by chlorosulfonic acid.

16. The method of claim 12 comprising providing an excess of chlorosulfonic acid to simultaneously oxidize said reaction product of step (a) and sulfonate said aryl radical to thereby recover a polymer comprising sulfonated aryl radicals in step (c).

17. The method of claim 13 wherein said aryl radical is phenyl and said polymer recovered in step (c) comprises sulfonated phenyl radicals.

18. The method of claim 12 wherein step (a) and step (b) are carried out in the presence of a solvent comprising dichloroethane.

19. The method of claim 12 wherein n is about 2.

20. A method for preparing polymer having pendant sulfonic acid groups which comprises:
  (a) reacting a nonaqueous solution comprising an organic compound represented by the formula

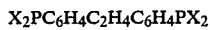

wherein $R^1$ represents an aryl moiety, with a phosphorus trihalide represented by the formula $PX_3$, and a zirconium halide salt, represented by the formula $ZrX_4$, wherein X is chlorine or bromine and H is covalently bonded to an aryl ring, to yield a first mixture comprising $R^1$—$PX_2$ and said zirconium halide salt,
  (b) oxidizing and sulfonating said reaction product of step (a) to yield a mixture comprising a sulfonated aryl phosphonyl halide and said zirconium halide salt, and
  (c) hydrolyzing said mixture of step (b) to precipitate a polymer having pendant sulfonic acid groups.

21. The method of claim 20 wherein said sulfonated aryl phosphonyl halide is represented by the general formula $HO_3S$—$R^1$—$P(O)X_2$ and said inorganic polymer is represented by the general formula $Zr(O_3PR^1SO_3H)_n$ wherein n varies from about 1 to about 2.5.

22. The method of claim 21 wherein said dihalophosphination is carried out in the presence of dichloroethane.

23. The method of claim 22 wherein $R^1$ is a phenyl radical.

24. The method of claim 20 wherein said sulfonated aryl phosphonyl halide is represented by the general formula:

$$X_2PC_6H_4C_2H_4C_6H_4PX_2$$

and said inorganic polymer is represented by the general formula:

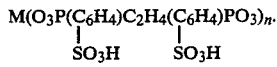

* * * * *